(12) United States Patent
Whitworth et al.

(10) Patent No.: US 8,663,396 B2
(45) Date of Patent: Mar. 4, 2014

(54) METHOD FOR CLEANING OIL SOAKED BONDED PANELS AND LAMINATES

(75) Inventors: Denver Ray Whitworth, North Richland Hills, TX (US); Vance Newton Cribb, III, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/321,448

(22) PCT Filed: May 29, 2009

(86) PCT No.: PCT/US2009/045559
§ 371 (c)(1),
(2), (4) Date: Nov. 18, 2011

(87) PCT Pub. No.: WO2010/138125
PCT Pub. Date: Dec. 2, 2010

(65) Prior Publication Data
US 2012/0060867 A1    Mar. 15, 2012

(51) Int. Cl.
*B32B 38/16* (2006.01)
*B32B 43/00* (2006.01)

(52) U.S. Cl.
CPC .................................... *B32B 43/00* (2013.01)
USPC .......................................................... 134/21

(58) Field of Classification Search
USPC .......................................................... 134/21
See application file for complete search history.

(56) References Cited

U.S. PATENT DOCUMENTS

| | | | |
|---|---|---|---|
| 3,827,857 A | 8/1974 | Boulus | |
| 5,762,717 A | 6/1998 | Hugo et al. | |
| 6,096,700 A | 8/2000 | Weir et al. | |
| 6,136,775 A | 10/2000 | Strout et al. | |
| 6,726,386 B1 * | 4/2004 | Gruenbacher et al. | 401/7 |
| 6,739,073 B2 | 5/2004 | Chou | |
| 7,093,612 B2 | 8/2006 | Greene et al. | |
| 2006/0191624 A1 * | 8/2006 | Whitworth et al. | 156/94 |
| 2006/0247146 A1 | 11/2006 | Greenberg | |

FOREIGN PATENT DOCUMENTS

GB    2346158 A    8/2000

OTHER PUBLICATIONS

Armstrong et al., Care and Repair of Advance Composites, 2nd Ed., SAE International, pp. 267-270.*
SAE Aerospace Recommended Practice 4916, Issued Mar. 1997, SAE Aerospace, pp. 28-44.*
International Search Report and the Written Opinion of the International Searching Authority mailed by ISA/USA, U.S. Patent and Trademark Office on Jul. 27, 2009 for International Patent Application No. PCT/US09/45559, 7 pages.

(Continued)

*Primary Examiner* — Michael Barr
*Assistant Examiner* — Caitlin N Dunlap
(74) *Attorney, Agent, or Firm* — James E. Walton

(57) ABSTRACT

A method of cleaning a contaminated composite part, so as to provide a surface suitable for adhesive bonding. The method includes applying a wicking medium adjacent to a surface of the contaminated composite material. Then applying a solvent medium soaked in a cleaning solution adjacent to the wicking medium. Then vapor barrier is applied adjacent to the solvent medium. Next a breather material is applied adjacent to the vapor barrier. Then a vacuum bagging film with a vacuum port is applied and sealed against the composite part. The composite part is then heated and vented to remove contaminates from the composite material.

15 Claims, 4 Drawing Sheets

(56) References Cited

OTHER PUBLICATIONS

Corrected International Preliminary Report on Patentability mailed by IPEA/USA, U.S. Patent and Trademark Office on Oct. 18, 2011 for International Patent Application No. PCT/US09/45559, 11 pages.

Extended European Search Report in related European patent application No. 09845343, 9 pages, mailed Nov. 8, 2013.

\* cited by examiner

METHOD FOR CLEANING OIL SOAKED BONDED PANELS AND LAMINATES

TECHNICAL FIELD

The present application relates in general to removal of contaminants from composite parts so as to provide a clean bonding surface, specifically removal of contaminants internal to a composite part.

DESCRIPTION OF THE PRIOR ART

Composite parts have been around for decades and have a multitude of applications. One application of a composite part is as a structural member on land, sea, and air vehicles. For example, it is common for a helicopter to utilize composite panels for cowling around an engine. Composite panels around an engine are exposed to many fluids associated with operation and maintenance of the helicopter. Examples of such fluids include fuel, hydraulic fluid, grease, and cleaning fluids. These fluids are not only deposited onto the surface of the composite panel, but also penetrate into the interior of the panel itself. Fluids can penetrate into the composite panel as a liquid or as a gas. Fluid in liquid form can migrate into the part through the natural porosity of the composite, as well as, through any crack or puncture that might exist. Fluid in gaseous form may migrate into the composite part during high temperature conditions as a vapor, and then condense back into a liquid state during low temperature conditions.

It is common for composite parts of helicopters and other vehicles to require repair and/or modification during the life of the helicopter. With respect to repair, if a helicopter sustains damage to a composite structure, it is generally more economical to repair the structure than to replace it. For example, if a composite panel sustains damage from a bullet during operation, then it is cheaper, faster, and easier to repair the hole in the panel than to obtain a replacement panel. Moreover, repair is often the only option available, particularly if a replacement panel is not readily available for purchase, or if the helicopter is far from a maintenance facility. With respect to modification, it is often more desirable to modify an existing part than to fabricate a completely new part. This is particularly true when updating aircraft to advanced configurations. Such modifications often require the bonding of new structures to existing composite structures via adhesives. For example, it is often desirable to modify existing aircraft by bonding brackets, nutplates, and wire harness standoffs to the surfaces of existing composite parts.

In order to obtain sufficient bond strength, the bonding surface of the composite part must be clean and free of contaminants. To ensure that the bonding surface is clean and free of contaminants, the laminate surface of the composite panel must be exposed by removing all paint, primer, and contaminants from the outer surface of the composite part. If the interior portion of the composite panel is free from contaminants, then the repair or modification structure can be carried out. However, if the composite panel has sustained internal contamination, then the repair or modification cannot be performed, because the surface of the composite panel will not stay sufficiently clean to provide a proper bonding surface. The fluids internal to the composite part migrate to the surface, thereby inhibiting the bonding of the repair or modification structure. Basically, if a composite panel is internally contaminated, then it must be scrapped and replaced. Replacement of internally contaminated composite parts causes added expense and often prevents the operation of the vehicle until the replacement composite part can be obtained.

While there have been significant advancements in the field of repair and modification of composite parts, significant shortcomings remain.

BRIEF DESCRIPTION OF THE DRAWINGS

The novel features believed characteristic of the application are set forth in the appended claims. However, the application itself, as well as, a preferred mode of use, and further objectives and advantages thereof, will best be understood by reference to the following detailed description when read in conjunction with the accompanying drawings, wherein:

Figure 1A:
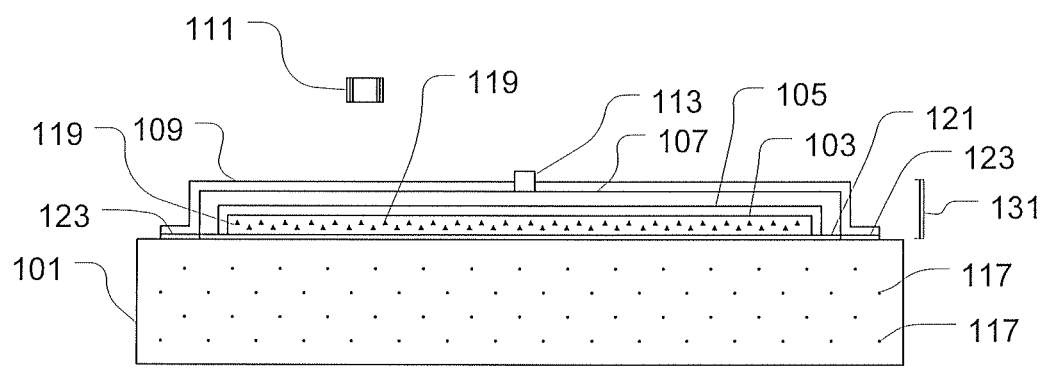
FIGS. 1A-1D are schematic cross-sectional views depicting the preferred embodiment of a method of cleaning a contaminated composite part according to the present application.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as described herein.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The method of the present application includes several processes: a set-up process, a dispersion process, an evacuation process, and a removal process. The set-up process is generally described with reference to FIGS. 1A and 2A, the dispersion process is generally described with reference to FIGS. 1B and 2B, the evacuation process is generally described with reference to FIGS. 1C and 2C, and the removal process is generally described with reference to FIGS. 1D and 2D.

Referring to FIG. 1A in the drawings, the set-up process is described. A composite part 101 containing various contaminants 117 dispersed throughout the internal portions of composite part 101 is shown. In this embodiment, composite part 101 is a component part of a helicopter. Composite part 101 may be planar or non-planar, having a simple shape or a complex configuration. Composite part 101 may include a wide variety compositions and materials, including a honeycomb core, and may have multiple plies, layers, and/or laminates. In this example, the removal of contaminants 117 from composite part 101 is for the purpose of providing an adequate bonding surface for repair or modification of composite part 101. As such, it is desirable to identify a selected bonding surface area on the surface of composite part 101 where the bonding will take place. It is preferred that the surface of composite part 101 be cleaned to a minimum of approximately three inches beyond the bonding surface area, if possible.

After the bonding surface area on the surface of composite part 101 has been identified, a wicking medium 121 is applied to the surface of composite part 101. In the preferred embodiment, wicking medium 121 is paper towel; however, wicking medium 121 may be any porous material that is capable of allowing the transfer of fluids. Next, a solvent medium 103 is applied adjacent to wicking medium 121. In the preferred embodiment, solvent medium 103 is a porous pad soaked in a cleaning solution 119; however, solvent medium 103 may be any porous material capable of absorbing and releasing cleaning solution 119. In the preferred embodiment, cleaning solution 119 is generally comprised of about 50% isopropyl alcohol and about 50% acetone by volume. This cleaning solution works well with contaminants 117 that are generally present in a helicopter environment; such as fuel, hydraulic fluid, grease, and cleaning fluids. However, it should be understood that cleaning solution 119 can be any combination of fluids that aid in the removal of contaminants 117 according to the methods of the present application. Examples of other fluids that can be used to comprise cleaning solution 119 are: other forms of alcohol, methyl ethyl ketone (MEK), naphtha, soap, jet fuel (such as JP4), and water, to name a few.

Next, a vapor barrier 105 is applied adjacent to solvent medium 103. In the preferred embodiment, vapor barrier 105 does not completely cover wicking medium 121. Vapor barrier 105 is preferably a vacuum bagging film, but may be any non-porous material that facilitates the migration of cleaning solution 119 into composite part 101. Next, a breather material 107 is applied adjacent to vapor barrier 105. Breather material 107 preferably covers any portions of wicking medium 121 that are not covered by vapor barrier 105. In the preferred embodiment, breather material 107 is porous Teflon film; however, breather material 107 may be any suitable porous material that can facilitate and direct the flow of contaminants 117 and cleaning solution 119 out of composite part 101, as explained below. Then, a vacuum bagging film 109 is sealed against composite part 101 with a vacuum bag sealant 123, so as to cover wicking medium 121 and breather material 107. Vacuum bagging film 109 can be any flexible non-porous material, including plastic, that has at least one vacuum port 113 to facilitate the evacuation of air, contaminants 117, and cleaning solution 119 from composite part 101. Vacuum bag sealant 123 is preferably a putty-like material used to create a seal between vacuum bagging film 109 and the surface of composite part 101. Wicking medium 121, solvent medium 103, vapor barrier 105, breather material 107, vacuum bagging film 109, vacuum bag sealant 123, and vacuum ports 113 are assembled to form a cleaning package 131. Once cleaning package 131 has been assembled and attached to composite part 101, the dispersion process may be initiated.

Figure 1B:
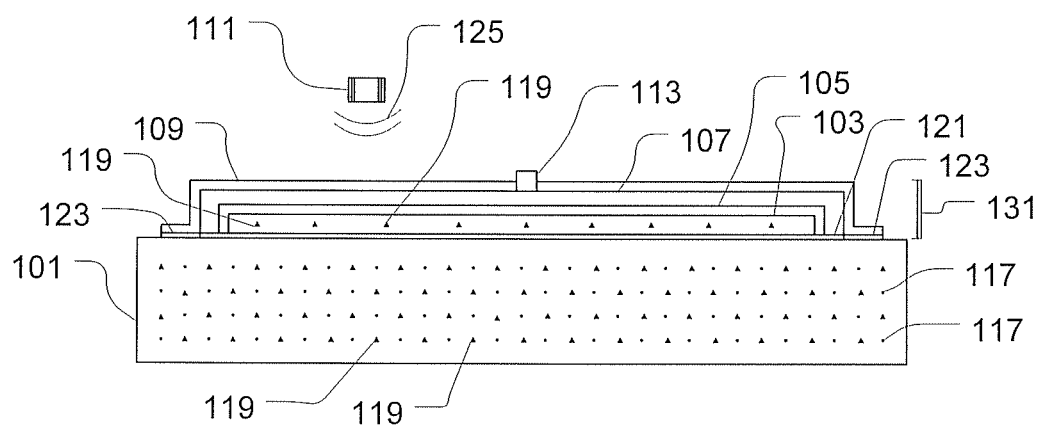

Referring now also to FIG. 1B in the drawings, the dispersion process is described. The dispersion process begins with subjecting cleaning package 131 and composite part 101 to a selected amount of heat 125 from at least one heat source 111. Heat source 111 is preferably an oven; however, heat source 111 may also be a one or more movable or hand-held heat sources, such as heat lamps, heat blankets, or any other suitable heat sources that are capable of transferring a sufficient amount of heat to cleaning package 131 and composite part 101. The use of an oven as heat source 111 is particularly well suited for applications in which composite part 101 is removable from the main structure, as ovens typically allow for precise and accurate control of the heat being applied to cleaning package 131 and composite part 101. For those applications in which an oven is not available, when composite part 101 will not fit into an oven, when a user cannot or does not want to remove composite part 101 from the main structure, or when it is desirable that only a portion of composite part 101 be subjected to elevated temperatures, the use of one or more heat lamps or heat blankets as heat source 111 may be desirable.

In the preferred embodiment, cleaning package 131 and composite part 101 are then heated to a cleaning temperature of up to about 200 degrees Fahrenheit. It is preferable to keep the cleaning temperature below 200 degrees, so as to reduce the risk of sudden outgasing within composite part 101, as such outgasing may cause damage to composite part 101 as a result of pressure expansion. Ideally, the cleaning temperature is about 190 degrees Fahrenheit. Then, vacuum ports 113 are opened for approximately 45 minutes; however, an active vacuum is not drawn through vacuum ports 113 during this time period. During this time period, heat 125 causes cleaning solution 119 and contaminants 117 to at least partially vaporize. The vaporized cleaning solution 119 migrates through wicking medium 121 and disperses throughout composite part 101, where the vaporized cleaning solution 119 mixes with the vaporized contaminants 117. Once the dispersion process is complete, the mixture of cleaning solution 119 and contaminants 117 can be evacuated out of composite part 101 in the evacuation process.

Figure 1C:
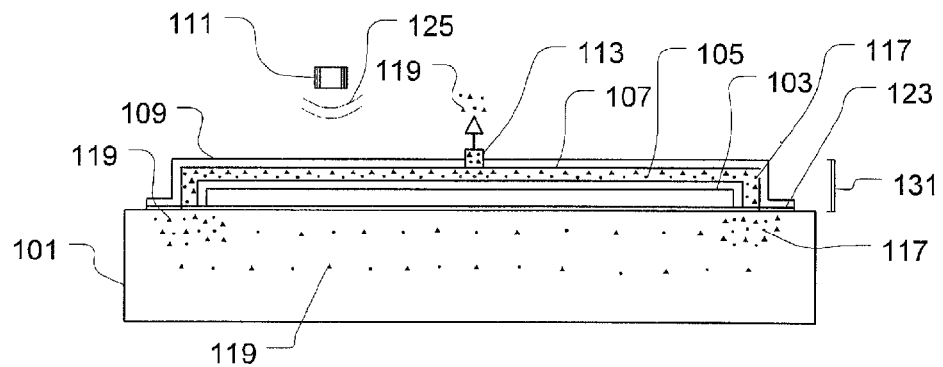

Referring now also to FIG. 1C in the drawings, the evacuation process is described. In the evacuation process, cleaning package 131 and composite part 101 are subjected to heat 125 from heat sources 111 and evacuated via vacuum ports 113 out of composite part 101. The temperature is preferably maintained at approximately 190 degrees Fahrenheit. A full vacuum from a vacuum source (not shown), e.g., about 25-28 inches of mercury, is applied via vacuum ports 113 for approximately 12 to 24 hours, or until substantially all of the mixture of contaminants 117 and cleaning solution 119 is evacuated. It will be appreciated that vacuum ports 113 may be located at one or more selected locations, so as to facilitate the migration of contaminants 117 and cleaning solution 119 out of composite part 101. The locations of heat sources 111 are preferably selected to facilitate uniform and continuous heating of cleaning package 131 and composite part 101. It should be understood that during the evacuation process contaminants 117 and cleaning solution 119 are preferably collected for reuse or proper disposal.

Figure 1D:
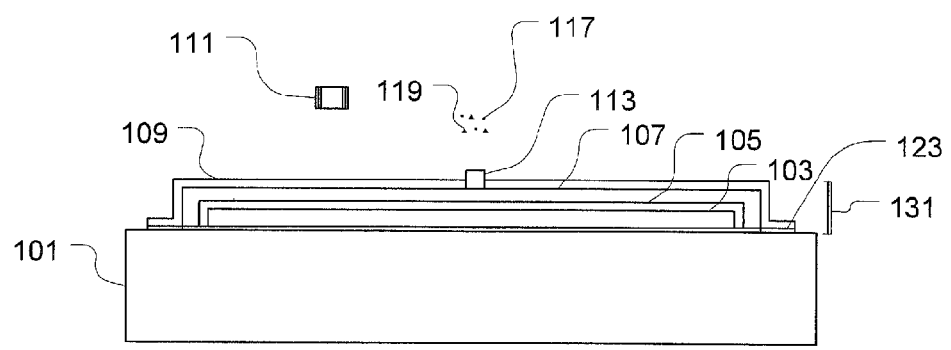

Referring now also to FIG. 1D in the drawings, the removal process is described. Once contaminants 117 and cleaning solution 119 have been sufficiently evacuated from composite part 101, heat sources 111 and the vacuum source are turned off. Then, cleaning package 131 is removed from composite part 101, so that composite part 101 may be prepared for bonding to another structure as desired.

Referring now to FIGS. 2A-2D in the drawings, an alternative embodiment of the method of the subject application is depicted. This embodiment is similar to the embodiment of FIGS. 1A-1D; however, in this embodiment, the composite part is completely enclosed by the cleaning package, as opposed to being only partially covered by the cleaning package. This embodiment is especially useful when the composite part is small and easily removable from the main structure, i.e., the aircraft.

Figure 2A:
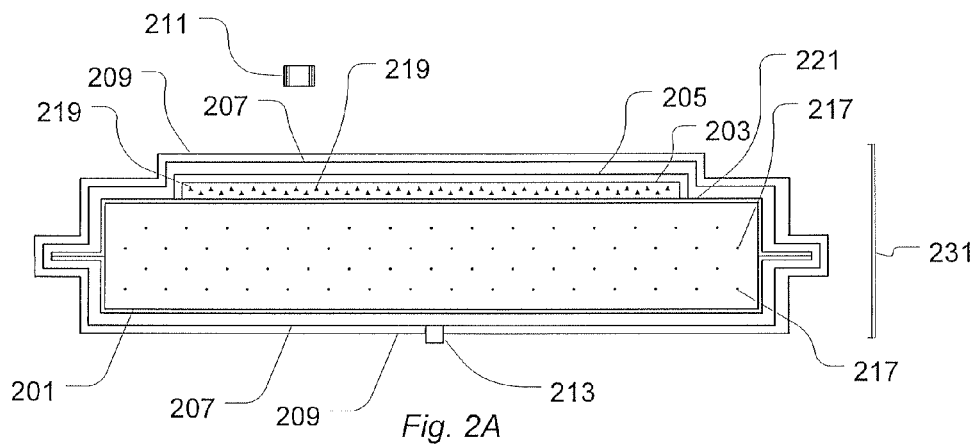
FIGS. 2A-2D are schematic cross-sectional views depicting an alternative embodiment of a method of cleaning a contaminated composite part according to the present application.

As is shown in FIG. 2A, a composite part 201 containing various contaminants 217 dispersed throughout the internal portions of composite part 201 is shown. In this example, the removal of contaminants 217 from composite part 201 is for the purpose of providing an adequate bonding surface for repair or modification of composite part 201. As such, it is desirable to identify a selected bonding surface area on the surface of composite part 201 where the bonding will take place. It is preferred that the surface of composite part 201 be cleaned to a minimum of approximately three inches beyond the bonding surface area, if possible. After the bonding surface area on the surface of composite part 101 has been identified, a wicking medium 221 is applied to completely enclose composite part 201. Wicking medium 221 may be a paper towel, but could be any porous material that is capable of allowing the transfer of fluids. Next, a solvent medium 203 is applied adjacent to wicking medium 221 to approximately three inches outside the surface to be used in bonding. Solvent medium 203 may be a porous pad soaked in a cleaning solution 219, but could also be any porous material capable of absorbing and releasing cleaning solution 219. Cleaning solution 219 is preferably similar in form and function to cleaning solution 119.

Next, a vapor barrier 205 is applied adjacent to solvent medium 203. In the preferred embodiment, vapor barrier 205 does not completely cover wicking medium 221. Vapor barrier 205 is preferably a vacuum bagging film, but may be any non-porous material that facilitates the migration of cleaning solution 219 into composite part 201. Next, a breather material 207 is applied to completely enclose composite part 201, wicking medium 221, solvent medium 203, and vapor barrier 205. In the preferred embodiment, breather material 207 is a porous Teflon film; however, breather material 207 may be any suitable porous material that can facilitate and direct the flow of contaminants 217 and cleaning solution 219 out of composite part 201. Then, a vacuum bagging film 209 is enclosed around composite part 201, wicking medium 221, solvent medium 203, vapor barrier 205, and breather material 207. Vacuum bagging film 209 could be any flexible non-porous material, including plastic, that has at least one vacuum port 213 to facilitate the evacuation of air, contaminants 217, and cleaning solution 219 from composite part 201. In some applications, an optional vacuum bag sealant may be used to create a vacuum seal, to facilitate the evacuation of air, contaminants 217, and cleaning solution 219 through vacuum port 213. The vacuum bag sealant would be similar to vacuum bag sealant 123. Wicking medium 221, solvent medium 203, vapor barrier 205, breather material 207, vacuum bagging film 209, and vacuum ports 213 are assembled to form a cleaning package 231. Once cleaning package 231 has been assembled and attached to composite part 201, the dispersion process may be initiated.

Figure 2B:
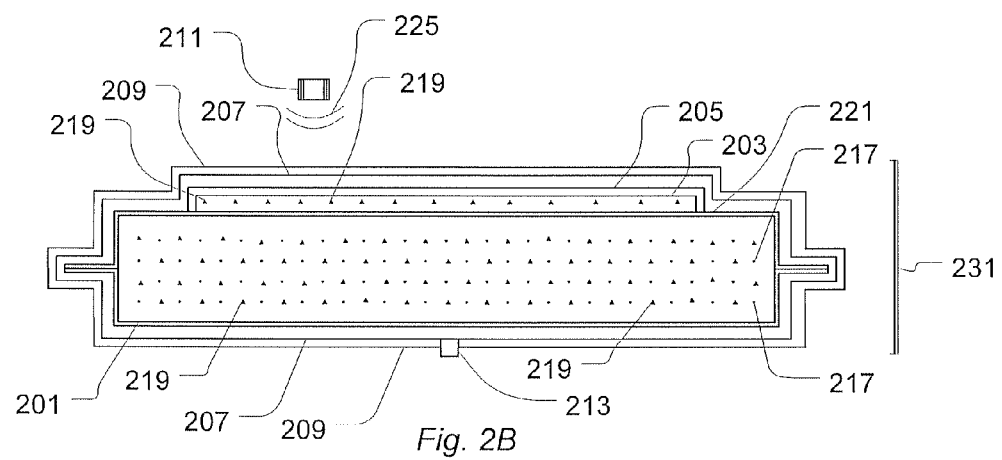

Referring now also to FIG. 2B in the drawings, the dispersion process is described. The dispersion process begins with subjecting cleaning package 231 and composite part 201 to a selected amount of heat 225 from at least one heat source 211. Heat source 211 is preferably similar in form and function to heat source 111. Cleaning package 231 and composite part 201 are then heated to a cleaning temperature of up to about 200 degrees Fahrenheit. It is preferable to keep the cleaning temperature below 200 degrees, so as to reduce the risk of sudden outgasing within composite part 201, as such outgasing may cause damage to composite part 201 as a result of pressure expansion. Ideally, the cleaning temperature is about 190 degrees Fahrenheit. Then, vacuum ports 213 are opened for approximately 45 minutes; however, an active vacuum is not drawn through vacuum ports 213 during this time period. During this time period, heat 225 causes cleaning solution 219 and contaminants 217 to vaporize. The vaporized cleaning solution 219 migrates through wicking medium 221 and disperses throughout composite part 201, where the vaporized cleaning solution 219 mixes with the vaporized contaminants 217. Once the dispersion process is complete, the mixture of cleaning solution 219 and contaminants 217 can be evacuated out of composite part 201 in the evacuation process.

Figure 2C:
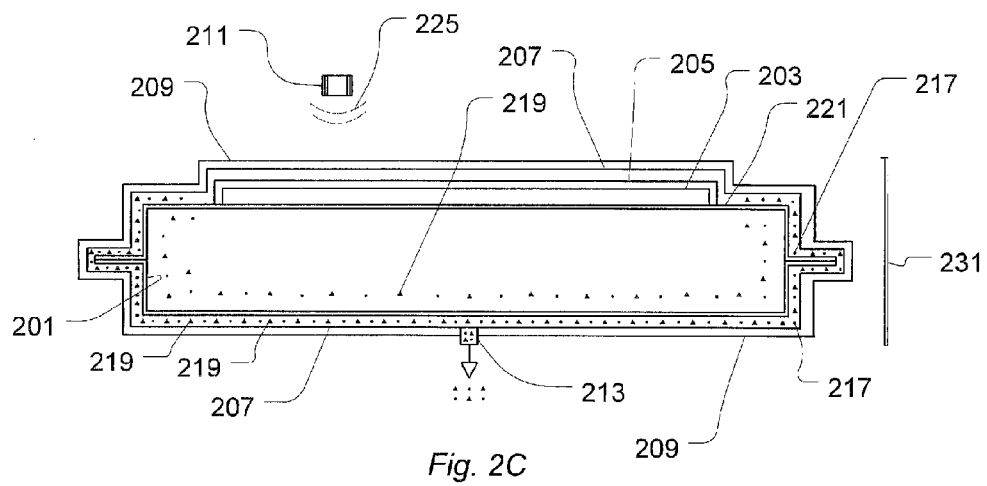

Referring now also to FIG. 2C in the drawings, the evacuation process is described. In the evacuation process, cleaning package 231 and composite part 201 are subjected to heat 225 from heat sources 211 and evacuated via vacuum ports 213. The temperature is preferably maintained at approximately 190 degrees Fahrenheit. A full vacuum from a vacuum source (not shown), e.g., about 25-28 inches of mercury, is applied via vacuum ports 213 for approximately 12 to 24 hours, or until substantially all of contaminants 217 and cleaning solution 219 are evacuated. It will be appreciated that vacuum ports 213 may be located at one or more selected locations, so as to facilitate the migration of contaminants 217 and cleaning solution 219 out of composite part 201. The locations of heat sources 211 are preferably selected to facilitate uniform and continuous heating of cleaning package 231 and composite part 201. It should be understood that during the evacuation process contaminants 217 and cleaning solution 219 are preferably collected for reuse or proper disposal.

Figure 2D:
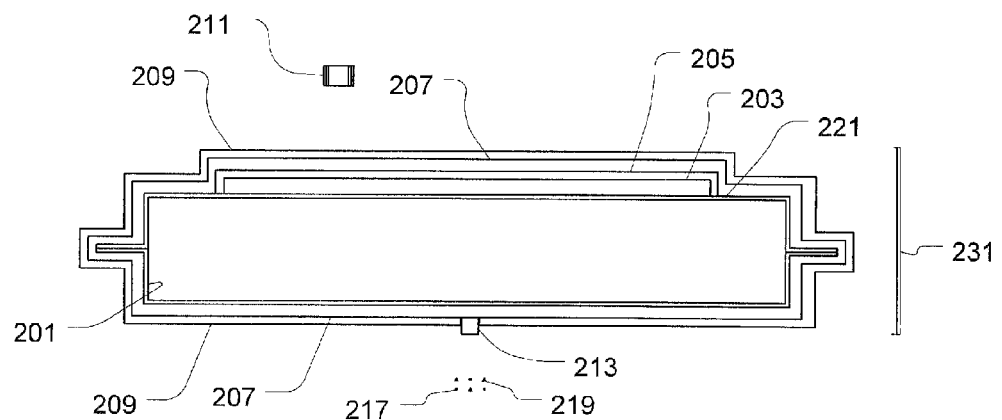

Referring now also to FIG. 2D in the drawings, the removal process is described. Once contaminants 217 and cleaning solution 219 have been sufficiently evacuated from composite part 201, heat sources 211 and the vacuum source are turned off. Then, cleaning package 231 is removed from composite part 201, so that composite part 201 may be prepared for bonding to another structure as desired.

It will be appreciated that in all of the embodiments disclosed herein, it may not be necessary for all of the contaminants and the cleaning solution to be fully evacuated through the vacuum ports by the vacuum source. For example, in some applications, some of the contaminants, such as contaminants 117 and 127, along with some of the cleaning solutions, such as cleaning solutions 119 and 219, may be absorbed by the wicking materials, such as wicking materials 121 and 221.

In one alternative embodiment, the step of applying heat may be eliminated. In such an embodiment, the process is generally the same as described above, with the exception that the cleaning solution is allowed to migrate out of the solvent medium and into the composite material, thereby mixing with the fluid contaminants, without the application of added heat.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A method of removing fluid contaminants from a composite material, comprising:
    applying a wicking medium adjacent to a surface of the composite material;
    applying a solvent medium having a cleaning solution adjacent to the wicking medium;
    applying a vapor barrier over the solvent medium;

applying a breather material over the wicking medium and the vapor barrier;

applying a vacuum bagging film over the breather material, the vacuum bagging film having at least one vacuum port;

heating the solvent medium and the composite material up to a selected temperature for a selected duration of time, such that the cleaning solution migrates out of the solvent medium and into the composite material, thereby mixing with the fluid contaminants; and drawing a vacuum through the at least one vacuum port, thereby drawing substantially all of the mixture of fluid contaminants and cleaning solution out of the composite material.

2. The method according to claim 1, further comprising:
opening the at least one vacuum port for a selected period of time prior to drawing the vacuum, so as to allow the heat to vaporize the cleaning solution and the fluid contaminants.

3. The method according to claim 2, wherein the selected period of time is about 45 minutes.

4. The method according to claim 1, wherein the step of applying the vacuum bagging film over the breather material includes sealing the vacuum bagging film to the composite material.

5. The method according to claim 4, wherein the step of sealing the vacuum bagging film to the contaminated composite material is accomplished with a vacuum bag sealant.

6. The method according to claim 1, wherein the selected temperature is up to about 200 degrees Fahrenheit.

7. The method according to claim 1, wherein the selected temperature is about 190 degrees Fahrenheit.

8. The method according to claim 1, wherein the selected duration of time is between about 12 hours and about 24 hours.

9. The method according to claim 1, wherein the selected duration of time is up to about 24 hours.

10. The method according to claim 1, wherein the step of heating the solvent medium and the composite material is accomplished by one or more of a heat lamp, a heat blanket, and an oven.

11. The method according to claim 1, wherein the cleaning solution comprises:
a solution of about 50% isopropyl alcohol and about 50% acetone by volume.

12. The method according to claim 1, wherein the cleaning solution comprises:
one or more of fluids chosen from the group consisting of:
alcohol;
methyl ethyl ketone (MEK);
naphtha;
soap;
jet fuel; and
water.

13. The method according to claim 1, wherein the composite material has a honeycomb core.

14. The method according to claim 1, wherein the step of drawing substantially all of the mixture of fluid contaminants and cleaning solution out of the composite material is accomplished by drawing substantially all of the mixture of fluid contaminants and cleaning solution through the breather material.

15. The method according to claim 1, wherein the vacuum bagging film completely covers a composite part.

* * * * *